United States Patent

Bell

[11] Patent Number: 5,852,409
[45] Date of Patent: Dec. 22, 1998

[54] TELEMETRY

[76] Inventor: David Bell, 570 Halifax Road, Wibsey, Bradford, West Yorkshire BD6 2NA, United Kingdom

[21] Appl. No.: 702,466
[22] PCT Filed: Feb. 27, 1995
[86] PCT No.: PCT/GB95/00405
§ 371 Date: Sep. 24, 1996
§ 102(e) Date: Sep. 24, 1996
[87] PCT Pub. No.: WO95/27273
PCT Pub. Date: Oct. 12, 1995

[30] Foreign Application Priority Data

Mar. 31, 1994 [GB] United Kingdom .................... 9406500
Sep. 10, 1994 [GB] United Kingdom .................... 9418266

[51] Int. Cl.⁶ .................................................. G08B 23/00
[52] U.S. Cl. .............................. 340/870.02; 340/870.03; 340/870.11; 340/825.47; 455/38.3
[58] Field of Search .................... 340/870.02, 870.03, 340/870.11, 825.47; 455/38.2, 38.3, 56.1, 343

[56] References Cited

U.S. PATENT DOCUMENTS 4,839,645  6/1989  Lill ..................................... 340/870.17
5,481,259  1/1996  Bane .................................. 340/870.03

FOREIGN PATENT DOCUMENTS 0013982   8/1980   European Pat. Off. .
0428322  11/1990   European Pat. Off. .
0420295   4/1991   European Pat. Off. .
57-115051  7/1982   Japan .
1101043   4/1989   Japan .
2210537   6/1989   United Kingdom .

*Primary Examiner*—Michael Horabik
*Assistant Examiner*—Andrew Hill
*Attorney, Agent, or Firm*—Edwin D. Schindler

[57] ABSTRACT

A remote telemetry metering system, includes one or more battery-powered metering units and a central data collection unit, each including a radio transceiver. The central data collection unit transmits a signal including power down time information and transmits instructions, which is received by each metering unit. Each metering unit extracts the power down time information and transmits instructions from the signal and, if appropriate, transmits data in response to the data transmit instructions; this data being collected by the central data collection unit. The metering units then interrupt the power supply to their transceivers for a period of time which is dependent upon the power down time information. The central data collection unit delays, for a slightly longer period of time before transmitting a further signal via its transceiver, at which time the power supply to the transceiver of each metering unit has already been resumed. By allowing the metering units to power down to a quiescent state under the control of the central data collection unit, flexibility is ensured and power consumption minimized.

25 Claims, 3 Drawing Sheets

TELEMETRY

This invention relates to telemetry systems of the type which provide two-way communication between a central data collection unit and one or more remote data gathering units. Such systems may find application in remote utility metering.

Existing remote metering systems are typically of two types. The first type is non-interactive in that the central data collection unit acts as a repository for the data transmitted to it from time to time by the remote data gathering units, but has no control over the timing of the transmission of such data. Each remote unit may power up, say, once every day to transmit its data to the central data collection unit and subsequently power down to a quiescent state. If the remote units are battery-powered, this results in battery life being prolonged because the remote units are only transmitting for a fraction of their working life. However, the inflexibility of one-way transmission and fixed timing makes it impossible, if the system is used for utility monitoring, to monitor peaks and troughs in demand effectively. A system of this type is disclosed in U.S. Pat. No. 3,924,224 and U.S. Pat. No. 4,940,976.

The second existing type of metering system is an interactive system in which the central data collection unit polls the remote data gathering units from time to time. In this way, the timing of data transmission from the remote units to the central data collection unit is under the control of the central data collection unit's operator or programmer and hence flexible. Nevertheless, there is a drawback and this is that the remote units must at all time be powered up to receive interrogating signals from the central data collection unit. Flexibility is gained at the expense of efficiency of power consumption at the remote units. If the remote units are battery-powered, this will markedly curtail the battery life. Systems of this type are exemplified by U.S. Pat. No. 4,811,011 and GB-2238147-A.

It is an object of the present invention to provide an interactive remote metering system in which the remote data gathering units are powered up only when data transmission is required and in which the timing of data transmission is under the control of the central data collection unit's operator or programmer. Accordingly, the present invention provides a data gathering system comprising one or more remote data gathering units and a central data collection unit, in which each remote data gathering unit and the central data collection unit includes a transceiver for the communication of information between the remote data gathering units and the central data collection unit, the central data collection unit comprises means for transmitting via its transceiver a signal including power down time information, each remote data gathering unit comprises means for extracting the power down time information from the signal received via its transceiver and means for subsequently interrupting the power supply to its transceiver for a period of time dependent upon the power down time information, and the central data collection unit further comprises means for delaying for a period of time dependent upon the power down time information before transmitting a further signal via its transceiver, at which time the power supply to the transceiver of each remote data gathering unit has already been resumed.

When the central data collection unit is interrogating the remote unit or units, part of the interrogating signal includes information as to the length of time which will expire before the next interrogating signal is transmitted. This may, for example, be four hours, or it may be ten minutes; it is entirely under the control of the operator or programmer of the central data collection unit. Each remote unit, after receiving the signal will transmit its data, if instructed to do so, and then powers down to a quiescent state for the period of time for which it has been so instructed.

The central data collection unit delays for a similar period of time before transmitting its next interrogating signal; but this period of time will be slightly longer than the period for which the meters are powered down to a quiescent state to take into account any drift out of sync which may occur in the meantime between the central data collection unit and the remote units. As a result, each remote unit will power up before the next transmission from the central data collection unit. Where the units keep time by means of internal clock crystals, the period of time delayed by the central data collection unit will be a greater number of cycles than that for which the remote units are powered down to a quiescent state. The difference in number of cycles will be calculated from the expected maximum drift.

To allow the central data collection unit to extract data from the remote data gathering units, it is preferred that the signal includes transmit instructions, each remote data gathering unit includes means for extracting the data transmit instructions from the signal received via its transceiver and means for transmitting data gathered, via its transceiver, in response to an instruction to do so included in the data transmit instructions and the central data collection unit includes means for extracting from a signal received via its transceiver the data provided by one or more remote data gathering units. The central data collection unit may selectively instruct a sub-set of the remote data gathering units to transmit data with each interrogating signal; the remainder simply power down to a quiescent state for the period specified until the next signal.

To ensure that the data transmitted by one remote data gathering unit does not interfere with that from others, it is preferred that the means for transmitting data gathered includes means for delaying the transmission of the data gathered for a period of time determined by the unique address attributed to the remote data gathering unit in question. The means for extracting from the signal the data provided by one or more remote data gathering units may include means for correlating that data with individual remote data gathering units in dependence upon the delay between transmission of the data transmit instructions and receipt of that data. The correlation provides an error checking mechanism backing up other identification methods, such as transmission by the remote data gathering unit of its unique address.

For security purposes, it is preferred that the signal from the central data collection unit include scramble code, each remote data gathering unit include means for extracting the scramble code from the signal received via its transceiver and means for scrambling the data gathered prior to transmission and the central data collection unit include means for unscrambling the signal received via its transceiver using the scramble code. This scramble code may be changed for each transmission by the central data collection unit.

The data gathering unit and central data collection unit used in the metering system according to the invention possess unique properties. Accordingly, the present invention also provides a data gathering unit comprising a transceiver for the communication of information between the data gathering unit and a central data collection unit, means for extracting power down time information from a signal received via the transceiver and means for subsequently interrupting the power supply to the transceiver for a period of time dependent upon the power down time information.

The data gathering unit may comprise a meter adapted to measure a predetermined quantity, e.g. a utility meter. The data gathering unit may be battery-powered and its transceiver may be adapted to communicate by radio.

As explained above, the data gathering unit preferably includes means for extracting data transmit instructions from the signal received via its transceiver and means for transmitting data gathered, via its transceiver, in response to an instruction to do so included in the data transmit instructions.

The means for transmitting data gathered may include means for delaying the transmission of the data gathered for a predetermined period of time.

The present invention further provides a central data collection unit comprising a transceiver for the communication of information between the central data collection unit and one or more remote data gathering units, means for transmitting via the transceiver a signal including power down time information and means for delaying for a period of time dependent upon the power down time information before transmitting a further signal via its transceiver.

The transceiver may be adapted to communicate by radio.

Again, the signal preferably includes transmit instructions and the central data collection unit includes means for extracting from a signal received via its transceiver data provided by one or more remote data gathering units in response to an instruction to do so included in the data transmit instructions.

The means for extracting from the signal data provided by one or more remote data gathering units may include means for correlating that data with individual remote data gathering units in dependence upon the delay between transmission of the data transmit instructions and receipt of that data.

The present invention also extends to a method of collecting data from one or more remote data gathering units each including a transceiver for the communication of information, means for extracting power down time information from a signal received via its transceiver and means for subsequently interrupting the power supply to its transceiver for a period of time dependent upon the power down time information, the method comprising transmitting a signal to each remote data gathering unit including power down time information to be extracted and delaying for a period of time dependent upon the power down time information before transmitting a further signal to the remote data gathering units, at which time the power supply to the transceiver of each remote data gathering unit has already been resumed.

Preferably, the signal includes transmit instructions, each remote data gathering unit includes means for extracting the data transmit instructions from the signal received via its transceiver and means for transmitting data gathered, via its transceiver, in response to an instruction to do so included in the data transmit instructions and the method further includes extracting from a signal transmitted by one or more remote data gathering units the data provided by one or more of them.

The means for transmitting data gathered may include means for delaying the transmission of the data gathered for a predetermined period of time unique to the remote data gathering unit in question. The method may include correlating the data provided by one or more remote data gathering units with individual remote data gathering units in dependence upon the delay between transmission of the data transmit instructions and receipt of the data.

The present invention will now be described with reference to the accompanying schematic drawings of a remote utility metering system.

Figure 1:
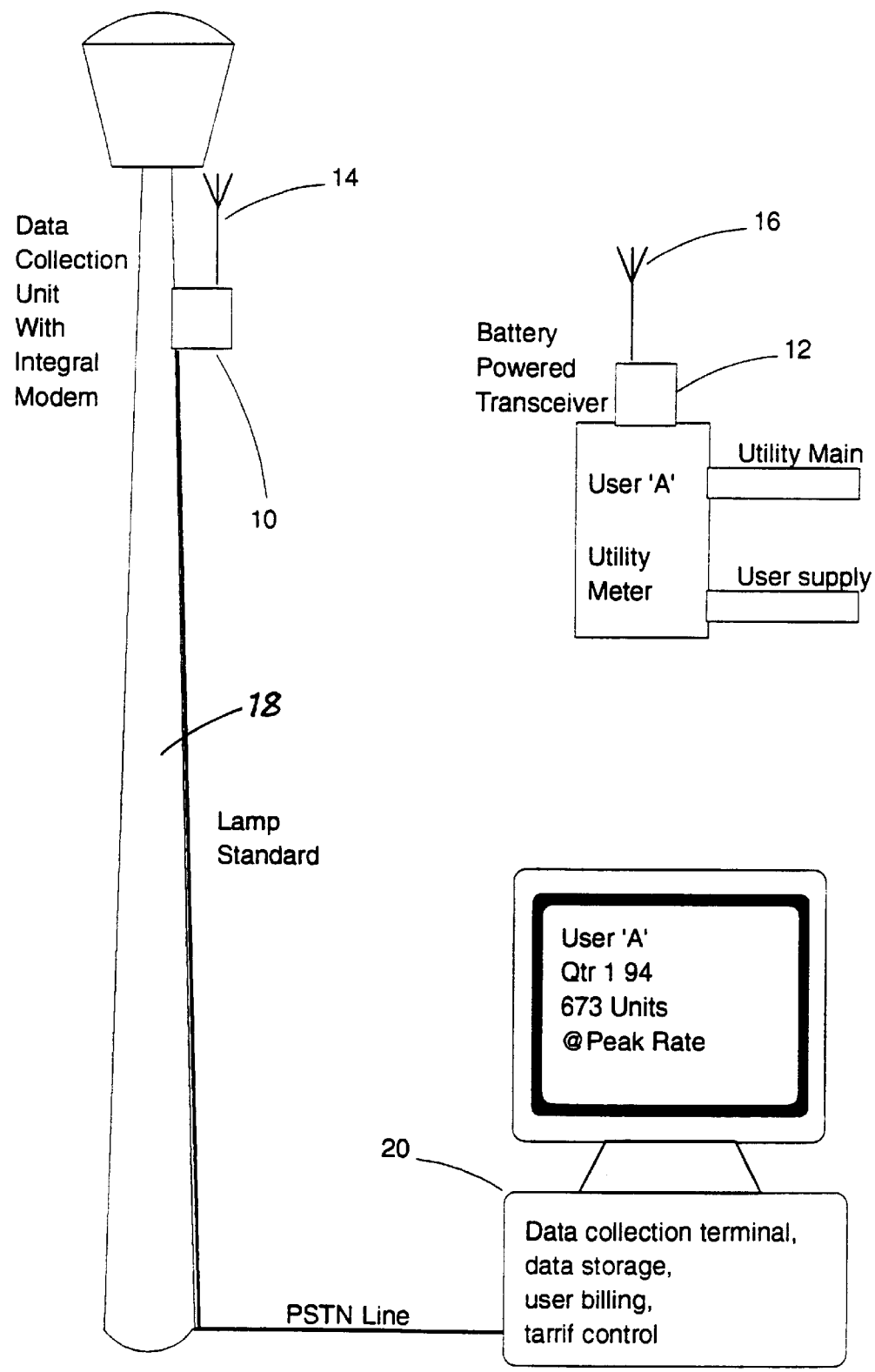
FIG. 1 is a system block diagram.

As can be seen from FIG. 1, the system includes a central data collection unit 10, 20 and one of more remote data gathering units, which in this application are metering units 12. The metering unit 12 may be an electricity meter, gas meter, water meter, etc. and is installed within the locality of a subscriber's premises. The metering unit 12 and the central data collection unit 10, 20 communicate with one another by radio and RF antennae 14, 16 are provided for this purpose.

The central data collection unit 10, 20 illustrated has a group data collection unit 10 installed on a lamp standard 18 which communicates, via a modem and the public telephone network, with a computer control station 20. The group data collection unit 10 is preferably mounted in an elevated position and is able to communicate with a radial group of metering units 12. In practice, more than one group data collection unit 10 will be provided for each computer control station. The computer control station 20 implements billing and tariff control on the basis of information received from the group data collection unit 10. The metering unit 12 is battery-powered and includes a low-power transceiver module with integral antenna 16.

Data is transferred from the utility meter through an appropriate known interface to the transceiver of the metering unit 12 for transmission. The system is controlled by the central data collection unit 10, 20 via the radio links to the metering units 12. For this purpose, a unique communications protocol has been developed and will be discussed below with reference to FIG. 3.

Figure 2:
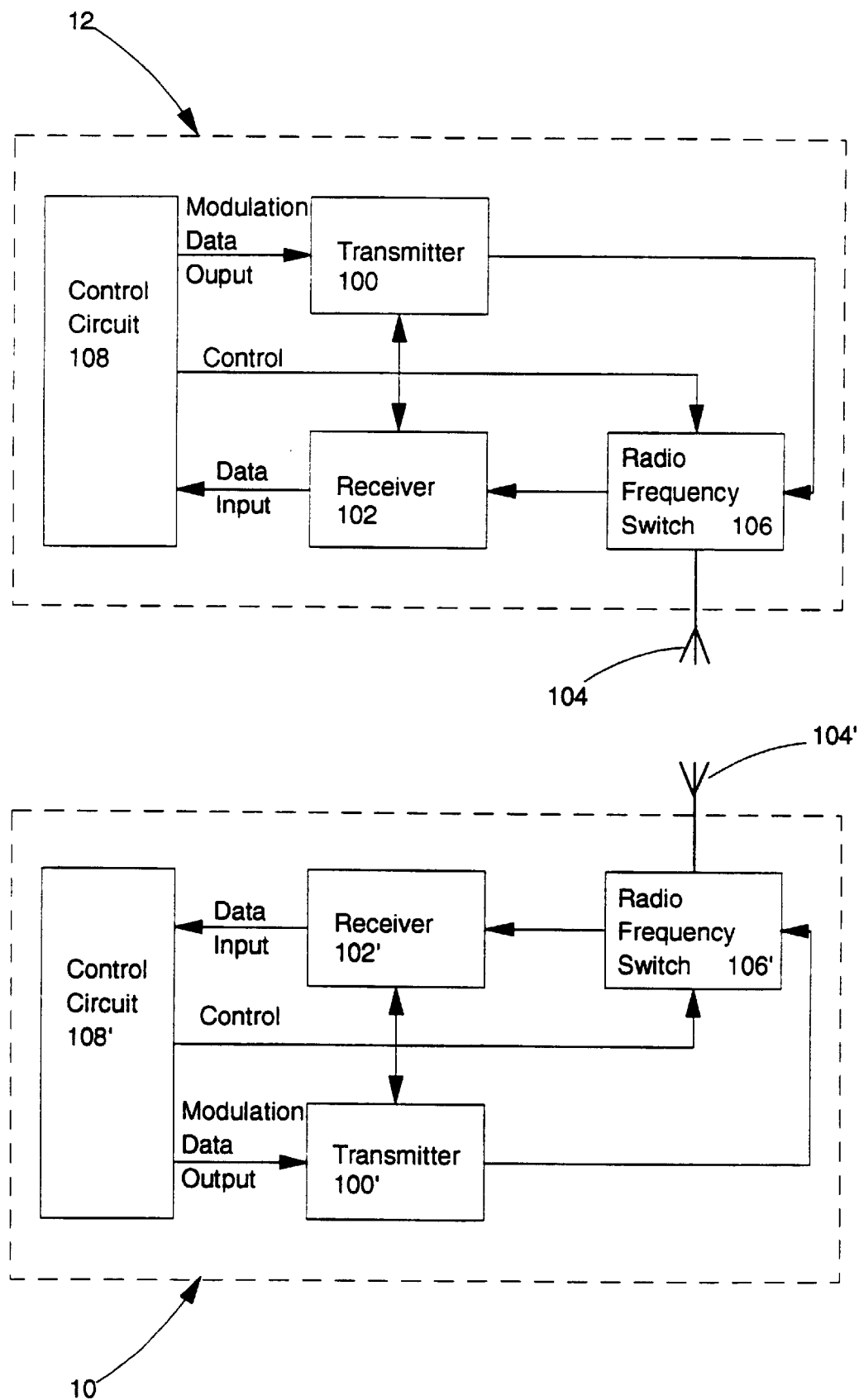
FIG. 2 is a diagram of the functional blocks of the transceivers embodied in the remote data gathering units.

FIG. 2 illustrates the functional blocks of the metering units 12 and the group data collection units 10. Each such unit 10, 12 includes an antenna 104, 104', a transmitter 100, 100', a receiver 102, 102' and a switch 106, 106' which selectively connects the receiver 102, 102' or the transmitter 100, 100' to the antenna 104, 104'. The switch 106, 106', transmitter 100, 100' and receiver 102, 102' are controlled by a CPU or other control circuit 108, 108', which selects either the transmitter 100, 100' or the receiver 102, 102' and also outputs the transmission bitstream to the transmitter 100, 100' or extracts a received bitstream from the receiver 102, 102'. Any form of transmitter 100, 100', receiver 102, 102' and switch 106, 106' would be appropriate to the present invention so long as the control circuits 108, 108' can effectively communicate with one another.

Apart from the transceiver functions, the remaining functions of the metering unit 12, viz. data processing, security coding—if desired, address decoding and transceiver power control may be performed by a second circuit, for example a low-power CMOS IC which may be a suitably programmed CPU. This CPU may be the same as or different from the control circuits 108, 108', already mentioned. The CMOS IC may use a low frequency crystal as its clock. With the metering unit's transceiver powered up for the time being, signals received via the transceiver are monitored by the CMOS IC.

As soon as an incoming signal is recognized as originating with the central data collection unit 10, 20, the CMOS IC separates it into power down time information and transmit instructions. If the transmit instructions apply to the particular metering unit 12 in question, it transmits its data in a predetermined form to the central data collection unit 10, 20 and then the transceiver is powered down to a quiescent state; if the transmit instructions do not apply to the particular metering unit 12, the receiver is immediately powered down to a quiescent state.

Each metering unit 12 has a unique programmed address, and interference between the transmissions from various metering units 12 is prevented by a transmission delay feature. The CMOS IC of each metering unit delays transmission of the metering unit's data by a period of time which is different for each metering unit and is linked to the metering unit's unique address.

As will be explained below, the metering units identify themselves to the central data collection unit by transmitting back their unique addresses. The central data collection unit 10, 20, as an additional check, correlates the data received in reply to its signals according to time elapsed between the transmission of its signal and the receipt of data in reply with individual metering units 12. This is done either by means of correlation look-up tables or by calculations based on a one-to-one mapping between metering unit address and delay time.

The transceiver of each metering unit 12 is powered down to a quiescent state for a time dependent upon the power down time information contained within the signal from the central data collection unit 10. In one system, as described below, the power down time information may be a seven bit number representing power down time in units of five minutes. This allows power down times of between five minutes and ten hours forty minutes.

Similarly, once all data is received, the central data collection unit 10, 20 waits for a period of time slightly longer than the power down time of the metering units, to ensure that these units are all powered up to receive notwithstanding any clock drift in the meantime, and then transmits its next signal. This signal then triggers the re-setting of the metering units' power down time counters such that they all begin counting the next period at the same instant.

As a safeguard on battery power, the metering units 12 may only power up for a relatively short period of time, such as 10 ms for example. This ensures that should the metering unit 12 and the central data collection unit 10, 20 become out of step with one another, for example owing to transmission artifacts, the metering unit will power down to a quiescent state after its 10 ms waiting period. As a result, a limitation is placed on the amount of time between signals from the central data collection unit 10, 20, to ensure that the various metering units and the central data collection unit do not drift out of sync by more than 10 ms, for example.

To enable the metering unit to get back on stream without having to be reset by a remote operative, it will transmit at half the last time delay plus its own unique address-related delay to alert the central data collection unit 10, 20 and repeatedly power up at fixed known intervals, e.g. 5 mins, to enable reactivation by the central data collection unit 10, 20, increasing the period for which it powers up its receiver by, say, 20 ms at each of these intervals until a limit, e.g. 200 ms, is reached, at which point it powers down until manually serviced.

When not transmitting, the central data collection unit 10, 20 listens for metering units 12 and, following receipt of an unsolicited transmission from a metering unit 12 will transmit at intervals of, say, 5 mins for 10 times to the metering unit in question with power down time information which will bring it into synchrony with any others which the central data collection unit communicates intentionally. The metering unit 12, upon receipt of the timing correction signal from the central data collection unit, will transmit an acknowledgement signal to the central data collection unit 10, 20 whereupon the latter will cease to transmit the timing correction signals.

Figure 3:
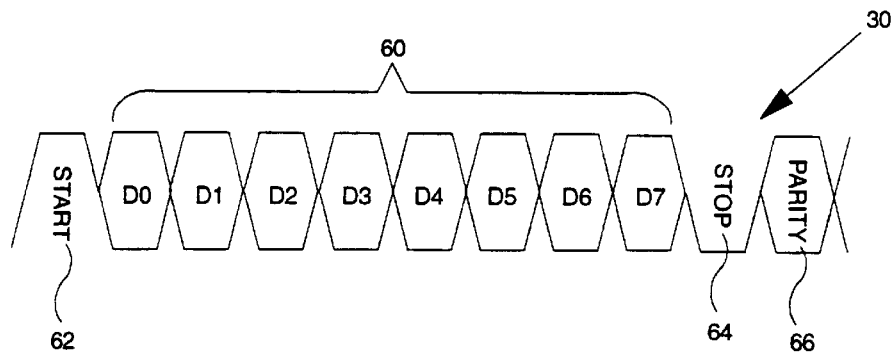
FIG. 3 is a diagram of the system transmission protocol.
Figure 3:
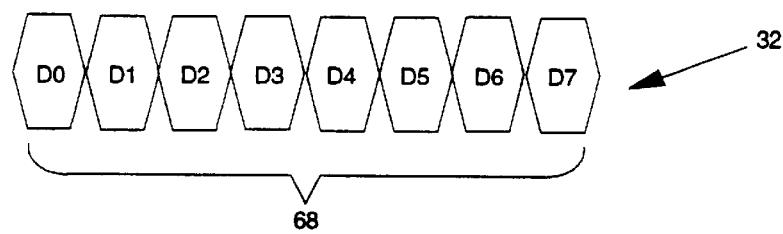
Figure 3:
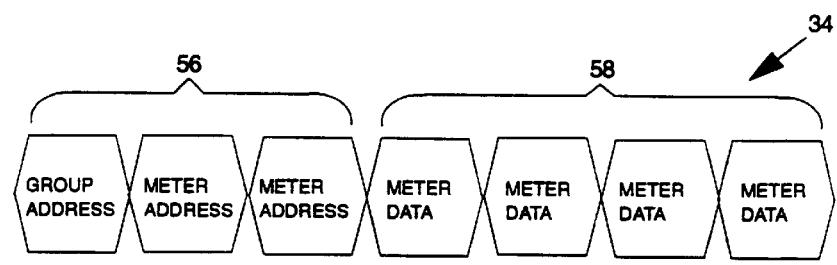
Figure 3:
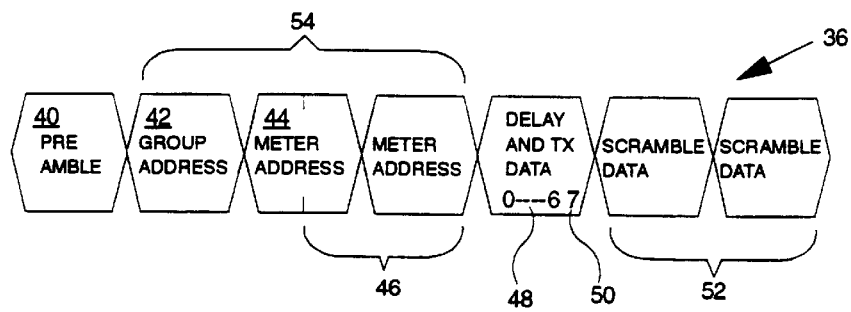

FIG. 3 illustrates the communications protocol which has been developed to deliver the functionality discussed. For communication from the metering units 12 to the central data collection unit, an eight bit serial protocol 30 is proposed having eight data bits 60, combined with start 62, stop 64 and parity bits 66 and scrambling. For communication from the central data collection unit 10, 20 to the metering units 12, the transmit protocol 32 is a string of eight bit words 68 with a preamble, but no start, stop or parity bits. This allows the metering unit control circuit 108 to be simplified.

The central data collection unit protocol 34 commences with an eight bit preamble 40 which enables the metering units 12 to detect the start of a new message. The next twenty-four bits 54 are dedicated to metering unit addressing. The first eight bits 42 are for group addressing, giving a maximum of 256 groups within radio range of the group data collection unit or units 10. The group address bits 42 enable the metering units 12 to determine that the signal received is sent by the central data collection unit 10. The next four bits 44 are control bits to indicate whether group, sub-group or individual metering unit addressing is being used. The final twelve bits 46 are the metering unit address, giving a maximum of 4096 metering units per group.

If individual metering unit addressing is specified, only one metering unit 12 will transmit data in reply and the transmission delay need not be applied. However with group or sub-group addressing, where more than one metering unit 12 will transmit in reply, the unique delay will come into play for each metering unit. The unique delay for each metering unit 12 addressing may differ in the case of group addressing from what is it for sub-group addressing, to ensure that all metering units 12 will transmit their data in as short a time as possible.

The next eight bits in the transmission protocol are used to control the metering unit receiver. The first seven 48 represent the power down period in units of 5 minutes. The final bit 50 of these eight indicates whether the metering units 12 are to transmit data; or whether the signal is purely for re-synchronization purposes.

The final sixteen bits 52 are pseudo-random code which are used for dynamically controlled scrambling of the metering unit's transmission. These bits are stored by the central data collection unit 10, 20 and may be used to descramble the incoming data from the metering units 12.

The metering unit transmission protocol 34 consists of three bytes 56 which are the group and metering unit address combined with the four addressing control bits as transmitted from the central data collection unit. There then follow n bytes of meter data 58—in this case n being 4—and these data are used for tariff control and billing by the central data collection unit 10, 20. All n+3 bytes are scrambled prior to transmission, e.g. by modulo-2 addition of the sixteen bit pseudo-random number applied to each pair of bytes. If n is even, the odd byte left will be scrambled by utilizing the first eight bits of the pseudo-random number.

I claim:

1. A data gathering unit comprising a transceiver for the communication of information between the data gathering unit and a central data collection unit, means for transmitting data in response to a signal received via the transceiver, means for extracting power down time information from the signal received via the transceiver and means for subsequently interrupting the power supply to the transceiver for a period of time dependent upon the power down time information.

2. A data gathering unit according to claim 1 in which the data gathering unit comprises a meter adapted to measure a predetermined quantity.

3. A data gathering unit according to claim 2 in which the meter is a utility meter.

4. A data gathering unit according to claim 1 which is battery-powered.

5. A data gathering unit according to claim 1 in which the transceiver is adapted to communicate by radio.

6. A data gathering unit according to claim 1 including means for extracting data transmit instructions from the signal received via its transceiver and means for transmitting data gathered, via its transceiver, in response to an instruction to do so included in the data transmit instructions.

7. A data gathering unit according to claim 6 in which the means for transmitting data gathered includes means for delaying the transmission of the data gathered for a predetermined period of time.

8. A data collection unit comprising a transceiver for the communication of information between the data collection unit and one or more remote data gathering units, means for transmitting via the transceiver a signal including power down time information and means for delaying for a period of time dependent upon the power down time information before transmitting a further signal via its transceiver.

9. A data collection unit according to claim 8 in which the transceiver is adapted to communicate by radio.

10. A data collection unit according to claim 8 in which the signal includes transmit instructions and the data collection unit includes means for extracting from a signal received via its transceiver data provided by one or more remote data gathering units in response to an instruction to do so included in the data transmit instructions.

11. A data collection unit according to claim 10 in which the means for extracting from the signal data provided by one or more remote data gathering units includes means for correlating that data with individual remote data gathering units in dependence upon the delay between transmission of the data transmit instructions and receipt of that data.

12. A telemetry system comprising one or more remote data gathering units and a central data collection unit, in which each remote data gathering unit and the central data collection unit includes a transceiver for the communication of information between the remote data gathering units and the central data collection unit, the central data collection unit comprises means for transmitting via its transceiver a signal including power down time information, each remote data gathering unit comprises means for extracting the power down time information from the signal received via its transceiver and means for subsequently interrupting the power supply to its transceiver for a period of time dependent upon the power down time information, and the central data collection unit further comprises means for delaying for a period of time dependent upon the power down time information before transmitting a further signal via its transceiver, at which time the power supply to the transceiver of each remote data gathering unit has already been resumed.

13. A telemetry system according to claim 12 in which the signal includes transmit instructions, each remote data gathering unit includes means for extracting the data transmit instructions from the signal received via its transceiver and means for transmitting data gathered, via its transceiver, in response to an instruction to do so included in the data transmit instructions and the central data collection unit includes means for extracting from a signal received via its transceiver the data provided by one or more remote data gathering units.

14. A telemetry system according to claim 13 in which the means for transmitting data gathered includes means for delaying the transmission of the data gathered for a predetermined period of time unique to the remote data gathering unit in question.

15. A telemetry system according to claim 14 in which the means for extracting from the signal the data provided by one or more remote data gathering units includes means for correlating that data with individual remote data gathering units in dependence upon the delay between transmission of the data transmit instructions and receipt of that data.

16. A telemetry system according to claim 13 in which the signal includes scramble code, each remote data gathering unit includes means for extracting the scramble code from the signal received via its transceiver and means for scrambling the data gathered prior to transmission and the central data collection unit includes means for unscrambling the signal received via its transceiver using the scramble code.

17. A method of collecting data from one or more remote data gathering units each including a transceiver for the communication of information, means for extracting power down time information from a signal received via its transceiver and means for subsequently interrupting the power supply to its transceiver for a period of time dependent upon the power down time information, the method comprising transmitting a signal to each remote data gathering unit including power down time information to be extracted and delaying for a period of time dependent upon the power down time information before transmitting a further signal to the remote data gathering units, at which time the power supply to the transceiver of each remote data gathering unit has already been resumed.

18. A method according to claim 17 in which the remote data gathering units comprise meters adapted to measure a predetermined quantity.

19. A method according to claim 18 in which the meters are utility meters.

20. A method according to claim 17 in which the remote data gathering units are battery-powered.

21. A method according to claim 17 in which the transceivers are adapted to communicate with one another by radio.

22. A method according to claim 17 in which the signal includes transmit instructions, each remote data gathering unit includes means for extracting the data transmit instructions from the signal received via its transceiver and means for transmitting data gathered, via its transceiver, in response to an instruction to do so included in the data transmit instructions and the method further includes extracting from a signal transmitted by one or more remote data gathering units the data provided by one or more of them.

23. A method according to claim 22 in which the means for transmitting data gathered includes means for delaying the transmission of the data gathered for a predetermined period of time unique to the remote data gathering unit in question.

24. A method according to claim 23, further including correlating the data provided by one or more remote data gathering units with individual remote data gathering units in dependence upon the delay between transmission of the data transmit instructions and receipt of the data.

25. A method according to claim 22 in which the signal includes scramble code, each remote data gathering unit includes means for extracting the scramble code from the signal received via its transceiver and means for scrambling the data gathered prior to transmission and the method includes unscrambling the signal received via its transceiver using the scramble code.

* * * * *